(12) United States Patent
Ouyang et al.

(10) Patent No.: US 10,514,501 B2
(45) Date of Patent: Dec. 24, 2019

(54) PHOTONIC CRYSTAL ALL-OPTICAL SELF-OR-TRANSFORMATION LOGIC GATE

(71) Applicant: Zhengbiao Ouyang, Shenzhen, Guangdong (CN)

(72) Inventors: Zhengbiao Ouyang, Guangdong (CN); Quanqiang Yu, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 216 days.

(21) Appl. No.: 15/626,248

(22) Filed: Jun. 19, 2017

(65) Prior Publication Data

US 2017/0322375 A1   Nov. 9, 2017

Related U.S. Application Data

(63) Continuation of application No. PCT/CN2015/097850, filed on Dec. 18, 2015.

(30) Foreign Application Priority Data

Dec. 19, 2014   (CN) .......................... 2014 1 0799695

(51) Int. Cl.
| | | |
|---|---|---|
| *G02B 6/122* | (2006.01) | |
| *G02F 3/00* | (2006.01) | |
| *G02F 1/365* | (2006.01) | |
| *G02B 6/125* | (2006.01) | |
| *G02B 6/12* | (2006.01) | |

(52) U.S. Cl.
CPC .......... *G02B 6/1225* (2013.01); *G02F 1/365* (2013.01); *G02F 3/00* (2013.01); *G02B 6/125* (2013.01); *G02B 2006/1213* (2013.01)

(58) Field of Classification Search
CPC ........ G02F 3/00; G02F 1/365; G02F 2201/06; G02F 2203/32; G02B 6/1223; G02B 6/1225; G02B 6/125
See application file for complete search history.

(56) References Cited

U.S. PATENT DOCUMENTS

2006/0062507 A1   3/2006   Yanik et al.

FOREIGN PATENT DOCUMENTS

CN   102226862 A   10/2011

OTHER PUBLICATIONS

2nd Office Action of counterpart Chinese Patent Application No. 201410799695.4 dated Jan. 12, 2017.

*Primary Examiner* — Robert E. Tallman
(74) *Attorney, Agent, or Firm* — Zhihua Han; Wen IP LLC

(57) ABSTRACT

A photonic crystal (PhC) all-optical self-OR-transformation logic gate, which comprises an optical-switch unit (OSU), a PhC structure unit, a reference-light source, a memory or delayer and a D-type flip-flop (DFF); an input port of a delayer is connected with a logic-signal X, and an output port of said delayer is connected with the logic-signal-input port of said OSU; a reference light is connected to the reference-light-input port of said OSU; two intermediate-signal-output ports of said OSU are respectively connected with the two intermediate-signal-input port of said PhC-structure unit; a clock-signal CP is connected to the clock-signal-CP-input port of said OSU and the second clock-signal-input port of said DFF; the signal-output port of said PhC-structure unit is connected with the D-signal input port of said DFF. The structure of the present invention is compact in structure, strong in anti-interference capability and ease in integration with other optical-logic elements.

13 Claims, 4 Drawing Sheets

| A | B | C | Y |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |

FIG. 4

PHOTONIC CRYSTAL ALL-OPTICAL SELF-OR-TRANSFORMATION LOGIC GATE

CROSS-REFERENCE TO RELATED APPLICATION

This application is a continuation application of Application No. PCT/CN2015/097850 filed on Dec. 18, 2015, which claims priority to Chinese Application No. 201410799695.4 filed on Dec. 19, 2014, the entire contents of which are hereby incorporated by reference.

FIELD OF THE INVENTION

The present invention relates to two-dimensional (2D) photonic crystal (PhC) optical self-OR-transformation logic gates.

BACKGROUND OF THE INVENTION

In 1987, the concept of PhC was proposed separately by E. Yablonovitch from United States Bell Labs who discussed how to suppress spontaneous radiation and by S. Johnfrom Princeton University who made discussions about photonic localization. A PhC is a material structure in which dielectric materials are arranged periodically in space, and is usually an artificial crystal consisting of two or more materials having different dielectric constants.

With the emergence of and in-depth research on PhC, people can control the motion of photons in a PhC material more flexibly and effectively. In combination with traditional semiconductor processes and integrated circuit technologies, design and manufacture of PhCs and devices thereof have continually and rapidly marched towards all-optical processing, and the PhC has become a breakthrough for photonic integration. In December 1999, the PhC was recognized by the American influential magazine *Science* as one of the top-ten scientific advances in 1999, and therefore has become a hot topic in today's scientific research field.

An all-optical-logic device mainly includes an optical amplifier-based logic device, a non-linear loop mirror logic device, a Sagnac interference-type logic device, a ring-cavity logic device, a multi-mode-interference logic device, an optical-waveguide-coupled logic device, a photoisomerized logic device, a polarization-switch optical-logic device, a transmission-grating optical-logic device, etc. These optical-logic devices have the common shortcoming of large size in developing large-scale integrated optical circuits. With the improvement of science and technology in recent years, people have also done research and developed quantum-optical-logic devices, nanomaterial-optical-logic devices and PhC optical-logic devices, which all conform to the dimensional requirement of large-scale integrated optical circuits. For modern manufacturing processes, however, the quantum-optical-logic devices and the nanomaterial-optical-logic devices are very difficult to be manufactured, whereas the PhC optical-logic devices have competitive advantages in terms of manufacturing process.

In recent years, PhC logic devices have become a hot area of research drawing widespread attentions, and it is highly likely for them to replace the current widely-applied electronic-logic devices in the near future. The PhC logic device can directly realize all-optical-logic functions, such as "AND", "OR", "NOT" and the like, and is a core device for realizing all-optical computing. In the process of realizing all-optical computing, PhC logical function devices based on "AND", "OR", "NOT", "XOR" and the like have been successfully designed and studied, and various complex logic components are still needed for achieving the goal of all-optical computing.

SUMMARY OF THE INVENTION

The present invention is aimed at overcoming the defects of the prior art and providing a PhC all-optical self-OR-transformation logic gate compact in structure, strong in anti-interference capability and easy to integrate with other optical-logic elements.

The technical proposal adopted by the invention to solve the technical problem is as follows:

A PhC all-optical self-OR-transformation logic gate of the present invention includes an optical switch unit (OSU), a PhC-structure unit, a reference-light source, a memory or delayer and a D-type flip-flop(DFF); an input port of a delayer is connected with a logic-signal X, and an output port of the delayer is connected with the logic-signal-input port of the OSU; a reference-light E is connected with the reference-light-input port of the OSU; two intermediate-signal-output ports of the OSU are respectively connected with the two intermediate-signal-input ports of the PhC-structure unit; a clock-signal CP is input through the input port of a two-branch waveguide, one port of the two-branch waveguide is connected with the clock-signal-CP-input port of the OSU, and another port of the two-branch waveguide is connected with the clock-signal-input port of the DFF; the signal-output port of the PhC-structure unit is connected with the D-signal-input port of the DFF.

The OSU is a 2×2 optical-selector switch; the OSU includes a clock-signal-CP-input port, a logic-signal-input port, a reference-light-input port and two intermediate-signal-output ports; the two intermediate-signal-output ports are respectively a first intermediate-signal-output port and a second intermediate-signal-output port.

The PhC-structure unit is a 2D-PhC cross-waveguide nonlinear cavity; the PhC-structure unit is 2D-PhC cross-waveguide four-port network formed by high-refractive-index dielectric pillars, a left port of the four-port network is a first intermediate-signal-input port, a lower port is a second intermediate-signal-input port, an upper port is a signal-output port, and a right port is an idle port; two mutually-orthogonal quasi-1D PhC structures are placed in two waveguide directions crossed at a center of a cross-waveguide; a dielectric pillar is arranged in a middle of the cross-waveguide, the dielectric pillar is made of a nonlinear material, the cross section of the dielectric pillar is square, polygonal, circular or oval; the dielectric constant of a rectangular linear pillar clinging to the central nonlinear pillar and close to the signal-output port is equal to that of the central nonlinear-pillar under low-light-power conditions; the quasi-1DPhC structures and the dielectric pillar constitute a waveguide defect cavity.

The memory or delayer 04 includes an input port and an output port; the output signal of the delayer has T/2 delay relative to the input signal thereof, where T is a clock period.

The memory or delayer provides the one of T/2 delay.

The DFF includes a clock-signal-input port, a D-signal-input port and a system-output port; the input signal of the D-signal-input port of the DFF is equal to the output signal of the output port of the PhC-structure unit.

The PhC structure is a (2k+1)×(2k+1) array structure, where k is an integer more than or equal to 3.

The cross section of the high-refractive-index dielectric pillar of the 2D-PhC is circular, oval, triangular or polygonal.

A background filling material for the 2D-PhC is air or a different low-refractive-index medium with the refractive index less than 1.4

The cross section of the dielectric pillar in the quasi-1D PhC is rectangular, polygonal, circular or oval, and the refractive index of the dielectric pillar is 3.4 or a different value more than 2.

Compared with the prior art, the present invention has the following advantages:

1. Compact in structure, and ease of manufacture;
2. Strong anti-interference capability, and ease of integration with other optical-logic elements; and
3. High contrast of high and low logic outputs, and fast operation.

These and other objects and advantages of the present invention will become readily apparent to those skilled in the art upon reading the following detailed description and claims and by referring to the accompanying drawings.

BRIEF DESCRIPTION OF THE DRAWINGS

In FIG. 1, the indications are: OSU 01, logic-signal-input port 11, reference-light-input port 12, first intermediate-signal-output port 13, second intermediate-signal-output port 14, PhC-structure unit 02, first intermediate-signal-input port 21, second intermediate-signal-input port 22, idle port 23, signal-output port 24, circularhigh-refractive-index linear-dielectric pillar 25, first rectangular high-refractive-index linear-dielectricpillar 26, second rectangular high-refractive-index linear-dielectric pillar 27, central nonlinear-dielectric pillar 28, reference-light 03, reference-light E, delayer or memory 04, logic-signal X, clock-signal CP, DFF 05, clock-signal-input port 51, D-signal-input port 52, system-output port 53.

FIG. 4 is a truth table of the logic functions of a 2D-PhC cross-waveguide nonlinear cavity shown in FIG. 1.

The present invention is more specifically described in the following paragraphs by reference to the drawings attached only by way of example.

DETAILED DESCRIPTION OF THE EMBODIMENTS

The terms a or an, as used herein, are defined as one or more than one, the term plurality, as used herein, is defined as two or more than two, and the term another, as used herein, is defined as at least a second or more.

Figure 1:
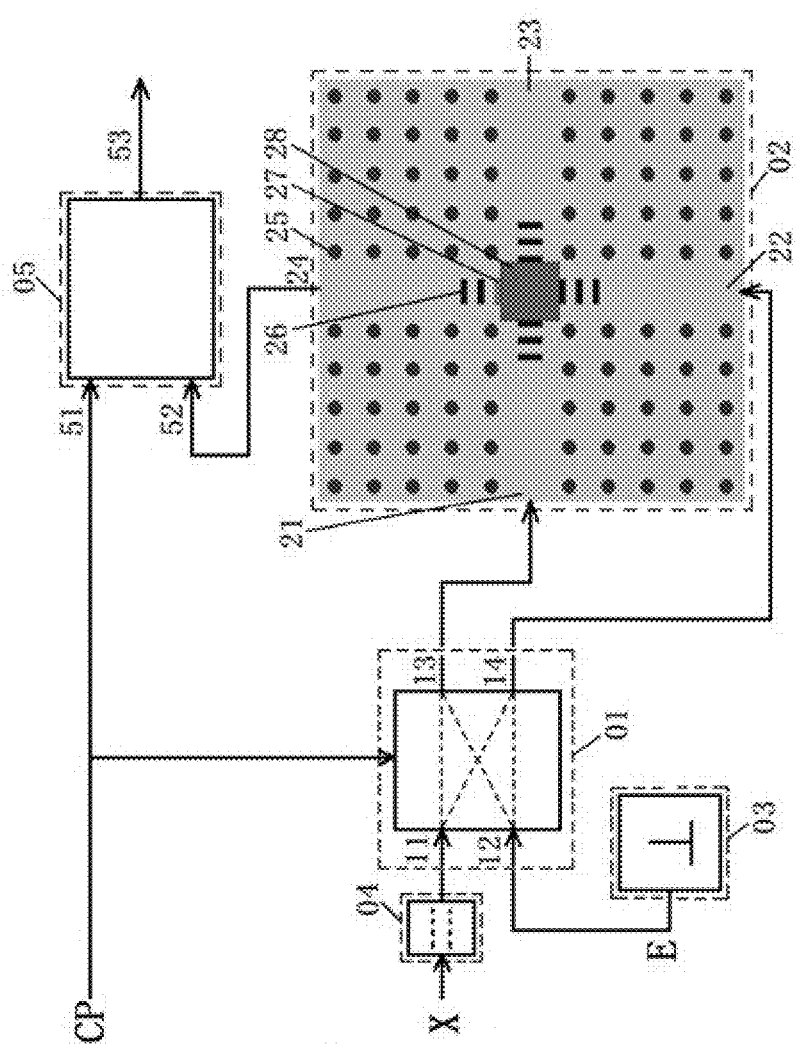
FIG. 1 is a structural schematic diagram of a PhC all-optical self-OR-transformation logic gate of the present invention.

As shown in FIG. 1, the PhC all-optical self-OR-transformation logic gate of the present invention includes an OSU 01, a PhC-structure unit 02, a reference-light source 03, a memory or delayer 04 and a DFF 05; the OSU 01 is a 2×2 optical-selector switch controlled by a clock-signal CP, used for controlling and selecting a logic-signal for outputting as the logic input of next stage of the PhC-structural unit; and includes a clock-signal-CP-input port, a logic-signal-input port, a reference-light-input port and two intermediate-signal-output ports; and the two intermediate-signal-output ports are respectively a first intermediate-signal-output port and a second intermediate-signal-output port; the memory or delayer 04 includes an input port and an output port; the memory or delayer provides the one of T/2 delay, the logic-signal X is input from the input port of the delayer 04, and the output port of the delayer outputs a delay-signal X(t−T/2) having T/2 delay and is connected with the logic-signal-input port 11 of the OSU; the memory or delayer is arranged between the delay-signal-input port of the system and the OSU, the delayer is used for delaying the input signal, the output signal of the delayer has a delay of T/2 relative to the input signal thereof, where T is a clock period; and a reference-light source outputs reference-light E, E=1, which is further projected to the reference-light-input port of an optical-selector switch; the first intermediate-signal-input port 21 of the PhC-structure unit 02 is connected with the first intermediate-signal-output port 13 of the optical-selector switch, the second intermediate-signal-input port 22 of the PhC-structure unit 02 is connected with the second intermediate-signal-output port 14 of the optical-selector switch; the DFF 05 includes a clock-signal-input port, a D-signal-input port and a system-output port; a clock-signal CP is input through the input port of a two-branch waveguide, one port of the two-branch waveguide is connected with the clock-signal-CP-input port of the optical-selector switch 01, and another port of the two-branch waveguide is connected with the clock-signal-input port 51 of the DFF 05; the signal-output port 24 of the PhC-structure unit 02 is connected with the D-signal-input port 52 of the PhC DFF 05, i.e., the input signal 52 at the D-signal-input port 52 of the DFF 05 is equal to the output signal at the output port 24 of the PhC-structure unit 02; the system-signal-output port 53 of the DFF 05 is the system-output port of the PhC all-optical self-OR-transformation logic gate of the present invention;

the PhC-structure unit 02 is a 2D-PhC cross-waveguide nonlinear cavity and is arranged behind the OSU, the background filling material for the 2D-PhC is air or a different low-refractive-index medium with a refractive index less than 1.4, the cross section of the high-refractive-index dielectric pillar of the 2D-PhC is circular, oval, triangular or polygonal, the 2D-PhC cross-waveguide nonlinear cavity is a 2D-PhC cross-waveguide four-port network formed by high-refractive-index dielectric pillars, the four-port network has a four-port PhC structure, the left port is a first intermediate-signal-input port, the lower port is a second intermediate-signal-input port, the upper port is a signal-output port, and the right port is an idle port; two mutually-orthogonal quasi-1D PhC structures are placed in two waveguide directions crossed at the center of a cross-waveguide, the cross section of the dielectric pillar in the quasi-1D PhC is rectangular, polygonal, circular or oval, the refractive index of the dielectric pillar is 3.4 or a different value more than 2, a dielectric pillar is arranged in the middle of the cross-waveguide, the dielectric pillar is made of a nonlinear material, the cross section of the dielectric pillar is square, circular, oval, triangular or polygonal, and the quasi-1D PhC structures and the dielectric pillar constitute a waveguide defect cavity. The lattice constant of the 2D-PhC array is d, and the array number is 11×11; the circular high-refractive-index linear-dielectric pillar 25 is made of a silicon (Si) material, and has a refractive index of 3.4 and a radius of 0.18 d; the first rectangular high-refractive-index linear-dielectric pillar 26 has a refractive index of 3.4, long sides of 0.613 d and short sides of 0.162 d; the second rectangular high-refractive-index linear-dielectric pillar 27 has a dielectric constant being the same as that of a nonlinear-dielectric pillar under low-light-power conditions, and has a dimension equal to that of the first rectangular high-refractive-index linear-dielectric pillar 26; and the central square nonlinear-dielectric pillar 28 is made of a Kerr-type nonlinear material, and has a side length of 1.5 d, a dielectric constant of 7.9 under low-light-power conditions and a third-order nonlinear coefficient of $1.33 \times 10^2 \, \mu m^2/V^2$. Twelve rectangular high linear-dielectric pillars and one square nonlinear-dielectric pillar are arranged in the center of the 2D-PhC cross-waveguide nonlinear cavity in the form of a quasi-1D PhC along longitudinal and transverse waveguide directions, the central nonlinear-dielectric pillar clings to the four adjacent rectangular linear-dielectric pillars and the distance there between is 0, every two adjacent rectangular linear-dielectric pillars are spaced 0.2668 d from each other, and the dielectric constant of a rectangular linear-pillar clinging to the central nonlinear-pillar and close to the signal-output port is equal to that of the central nonlinear-pillar under low-light-power conditions.

Figure 2:
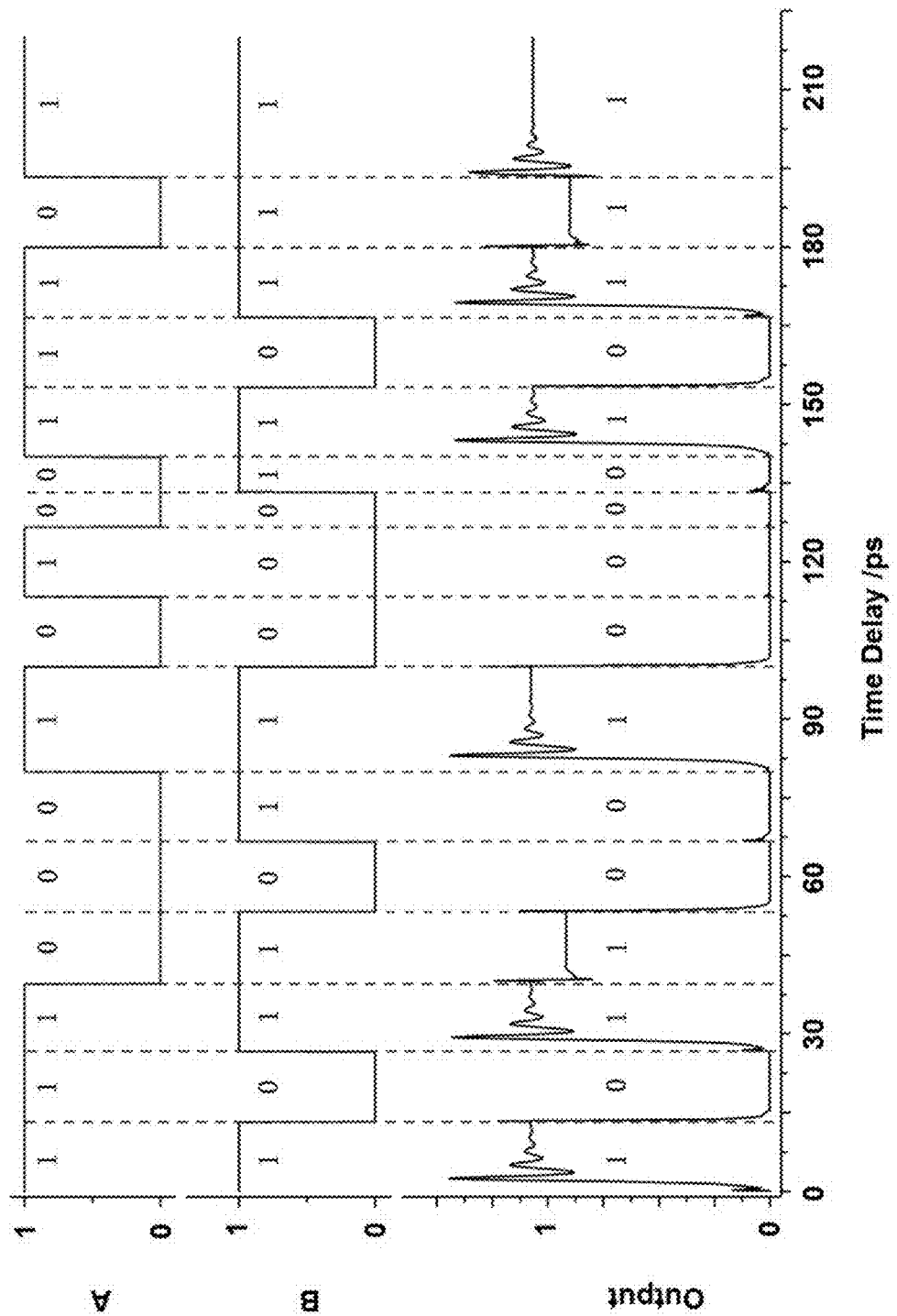
FIG. 2 is a waveform diagram of the basic logic functions of a PhC-structure unit of the present invention shown in FIG. 1 for the lattice constant d of 1 μm and the operating wavelength of 2.976 μm.
Figure 4:
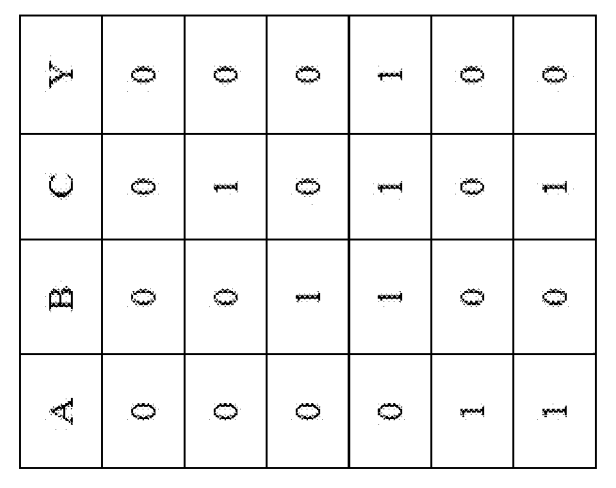

The present invention can realize a self-OR-transformation logic gate function and a multistep-delay self-OR-transformation logic gate function of all-optical-logic-signals under the cooperation of unit devices such as the optical switch, based on the photonic bandgap (PBG) characteristic, quasi-1D PhC defect state, tunneling effect and optical Kerr nonlinear effect of the 2D-PhC cross-waveguide nonlinear cavity shown by PhC-structure unit 02 in FIG. 1. Introduced first is the basic principle of the PhC nonlinear cavity in the present invention: a 2D-PhC provides a PBG with a certain bandwidth, a light wave with its wavelength falling into this bandgap can be propagated in an optical path designed inside the PhC, and the operating wavelength of the device is thus set to a certain wavelength in the PBG; the quasi-1D PhC structure arranged in the center of the cross-waveguide and the nonlinear effect of the central nonlinear-dielectric pillar together provide a defect state mode, which, as the input-light wave reaches a certain light intensity, shifts to the operating frequency of the system, so that the structure produces the tunneling effect and signals are output from the output port 24. For the lattice constant d of 1 μm and the operating wavelength of 2.976 μm, referring to the 2D-PhC cross-waveguide nonlinear cavity shown by 02 of FIG. 1, and for a signal A input from the port 21 and a signal B input from the port 22 as shown by the upper two diagrams in FIG. 2, a logic output waveform diagram of the 2D-PhC cross-waveguide nonlinear cavity of the present invention can be obtained, as displayed by the waveforms at the lower part in FIG. 2. A logic operation truth table of the structure shown in FIG. 4 can be obtained according to the logic operation characteristic shown in FIG. 2. In FIG. 4, C is current state $Q^n$, and Y is signal-output of the output port 24—the next state $Q^{n+1}$. A logic expression of the structure can be obtained according to the truth table.

$$Y=AB+BC \qquad (1)$$

That is $$Q^{n+1}=AB+BQ^n \qquad (2)$$

According to the basic logic operation characteristic of the above 2D-PhC cross-waveguide nonlinear cavity, the logic output of the previous step serves as a logic in put to the structure itself to realize logic functions.

As shown in FIG. 1, for CP=0, the optical-selector switch turns the input signal X(t−T/2) of the T/2 delay at the logic-signal-input port 11 to the second intermediate-signal-output port 14 of the optical-selector switch, and the input signal X(t−T/2) is further projected to the second intermediate-signal-input port 22 of the PhC-structure unit 02, thus the input signal of the second intermediate-signal-input port 22 of the PhC-structure unit 02 is equal to the input signal X(t−T/2) at the logic-signal-input port 11; simultaneously, the optical-selector switch turns the reference-light E at the reference-light-input port 12 to the first intermediate-signal-output port 13 of the OSU, and the reference-light E is further projected to the first intermediate-signal-input port 21 of the PhC-structure unit 02, thus the input signal of the first intermediate-signal-input port 21 of the PhC-structure unit 02 is equal to the reference-light E at the reference-light-input port 12.

For CP=1, the optical-selector switch turns the input signal X(t−T/2+1) at the logic-signal-input port 11 to the third intermediate-signal-output port 13 of the optical-selector switch, and the input signal X(t−T/2+1) is further projected to the first intermediate-signal-input port 21 of the PhC-structure unit 02; thus the input signal at the first intermediate-signal-input port 21 of the PhC-structure unit 02 is equal to the input-signal X(t−T/2+1) at the logic-signal-input port 11; simultaneously, the optical-selector switch turns the reference-light E at the reference-light-input port 12 to the second intermediate-signal-output port 14 of the optical-selector switch, and the reference-light E is further projected to the second intermediate-signal-input port 22 of the PhC-structure unit 02, thus the input signal of the second intermediate-signal-input port 22 of the PhC-structure unit 02 is equal to the reference-light E of the reference-light-input port 12.

The PhC structure of the device in the present invention can be of a (2k+1)×(2k+1) array structure, where k is an integer more than or equal to 3. Design and simulation results will be provided below in an embodiment given in combination with the accompanying drawings, wherein the embodiment is exemplified by an 11×11 array structure and a lattice constant d of 1 μm.

In formula (2), suppose A=1, leading to $$Q^{n+1}=B \qquad (3)$$

In formula (2), suppose B=1, leading to $$Q^{n+1}=A+Q^n \qquad (4)$$

Thus, the signal X is input to the second intermediate-signal-input port 22 of a PhC-structural unit 02 at the moment $t_n$, i.e., $B=X(t_n)$; simultaneously, supposing that the input signal A at the port 21 is equal to 1, the logic-input signal $X(t_n)$ at the moment $t_n$ is stored in an optical circuit; then, at the moment $t_{n+1}$, the signal $X(t_{n+1})$ is input to the first intermediate-signal-input port of 21 in the PhC-structural unit 02, i.e., the logic-input signal A at the first intermediate-signal-input port 21 at the moment is equal to $X(t_{n+1})$, and simultaneously, supposing that the logic-input-signal B of the second intermediate-signal-input port 22 is equal to 1, it can be obtained from formula (2).

$$Q^{n+1}=X(t_{n+1})+X(t_n) \qquad (5)$$

Hence, a CP signal, an optical switch and a reference-light source need to be introduced into the system; for CP=0, the optical switch 01 projects the signal X to the second intermediate-signal-input port 22, and simultaneously projects the signal "1" to the first intermediate-signal-input port 21; and for CP=1, the optical switch 01 projects the signal X to the first intermediate-signal-input port 21, and simultaneously projects the signal "1" to the second intermediate-signal-input port 22. Because the input quantity of logic-signals within a clock period is unchanged, a delayer having T/2delay needs to be introduced into the signal-input port of the system to realize an OR-transformation function of logic-signals of adjacent clock cycles.

The optical-selector switch operates as follows under the control of a clock-signal CP:

At a moment $t_n$, CP is made equal to 0, the optical-selector switch transmits the signal $X(t_n-T/2)$ of the logic-signal-input port 11 to the second intermediate-signal-output port 14, and the delay signal $X(t_n-T/2)$ is further projected to the second intermediate-signal-input port 22 of the PhC-structure unit 02; and simultaneously, the optical-selector switch transmits the reference-light E at the reference-light-input port 12 to the first intermediate-signal-output port 13, and the reference-light E is further projected to the first intermediate-signal-input port 21 of the PhC-structure unit 02; The output of the port 24 at this moment can be obtained from the expression (2):

$$Q^{n+1}=X(t-T/2) \quad (6)$$

At a moment $t_n$, CP is made equal to 1, the optical-selector switch turns the signal $X(t_{n+1}-T/2)$ at the logic-signal-input port 11 to the first intermediate-signal-output port 13, and the signal $X(t_{n+1}-T/2)$ is further projected to the first intermediate-signal-input port 21 of the PhC-structure unit 02; and simultaneously, the optical-selector switch turns the reference-light E at the reference-light-input port 12 to the second intermediate-signal-output port 14, and the reference-light E is further projected to the second intermediate-signal-input port 22 of the PhC-structure unit 02; the output at the port 24 at this moment can be obtained from the expression (2):

$$Q^{n+1}=X(t_{n+1}-T/2)+X(t_n-T/2)=X(t_{n+1})+X(t_n) \quad (7)$$

The output at the output port 24 of the PhC-structure unit 02 is equal to the input at the D-signal-input port 52 of the DFF 05, and it can be obtained from the expressions (6) and (7) that the input signal at the D-signal-input port 52 is $X(t_n-T/2)$ for CP=0 and is $X(t_{n+1})+X(t_n)$ for CP=1.

It can be known according to the logic characteristic of the DFF that for CP=1, the system output follows the input signal D; and for CP=0, the system output keeps the input signal D of the previous moment. Thus, it can be known that the output $Q^{n+1}$ at the system output port 53 of the device in the present invention is $Q^{n+1}=X(t_{n+1})+X(t_n)$ for CP=1; and at a next moment for CP=0, the system output keeps the output of the previous moment, i.e., the system output in a clock period is:

$$Q^{n+1}=X(t_{n+1})+X(t_n) \quad (8)$$

Hence, the device in the present invention can realize the self-OR-transformation logic function of logic-signals. If the delayer is changed into a T/2-step memory, the same function can be realized.

For the operating wavelength of 2.976 μm in the device, and the lattice constant d of 1 μm for the PhC-structure unit 02, the radius of the circular high-refractive-index linear-dielectric pillar 25 is 0.18 μm; the long sides of the first rectangular high-refractive-index linear-dielectric pillar 26 are 0.613 μm, and the short sides are 0.162 μm; the size of the second rectangular high-refractive-index linear-dielectric pillar 27 is the same as that of the first rectangular high-refractive-index linear-dielectric pillar 26; the side length of the central square nonlinear-dielectric pillar 28 is 1.5 μm, and the third-order nonlinear coefficient is $1.33 \times 10^{-2}$ μm$^2$/V$^2$; and the distance between every two adjacent rectangular linear-dielectric pillars is 0.2668 μm. Based on the above dimensional parameters, for the logic signal $X(t-T/2)$ is input according to the waveform shown in FIG. 3, a system output waveform diagram at the lower part of this figure can be obtained under the control of the clock-signal CP. Hence, the system carries out OR-logic operation on the logic input quantity $X(t_{n+1})$ and the logic input quantity $X(t_n)$ of the previous moment. That is, the self-OR-transformation logic function of logic-signals is realized.

Figure 3:
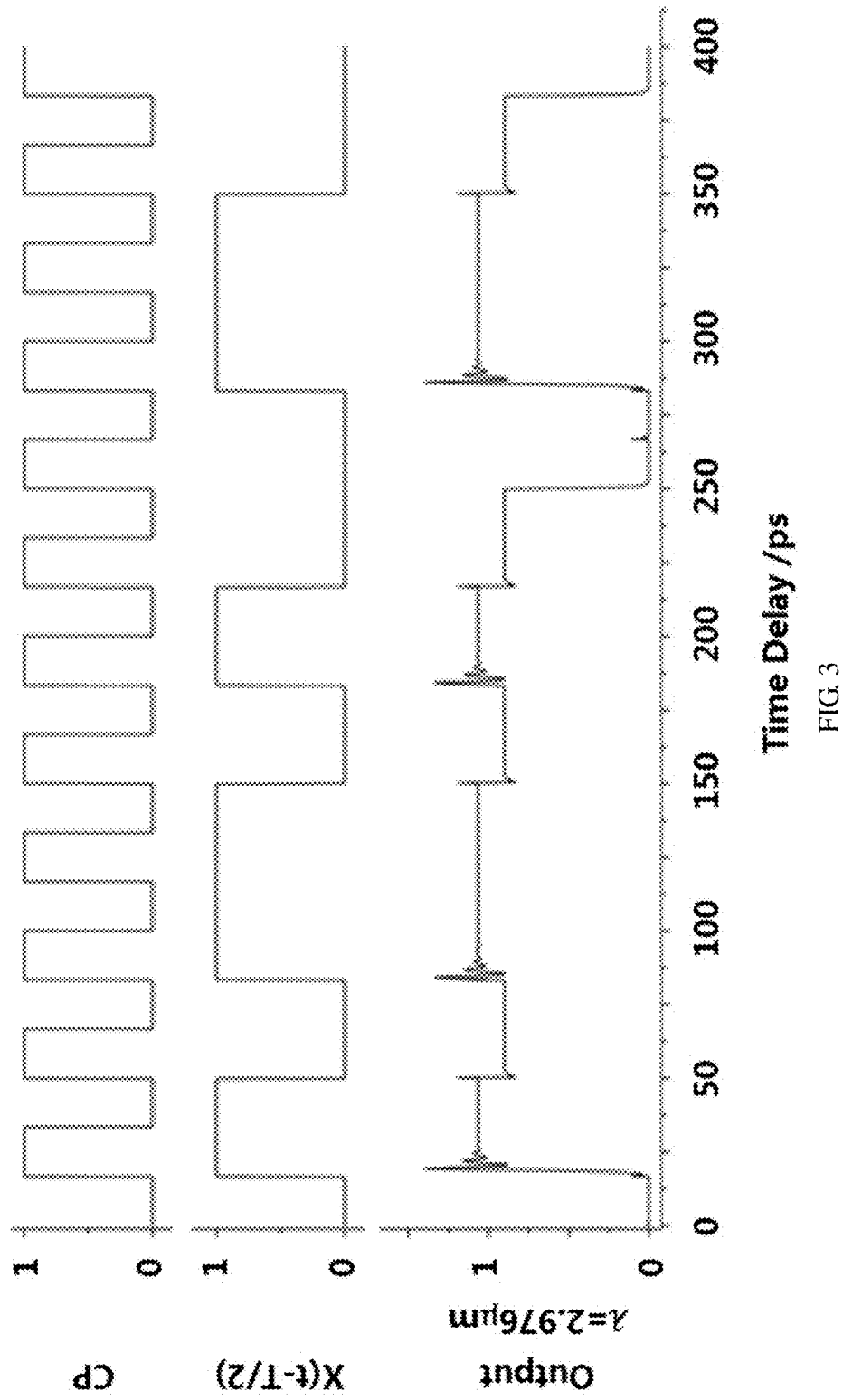
FIG. 3 is a waveform diagram of the logic-signal self-OR-transformation logic function of the PhC all-optical self-OR logic gate of the present invention for the lattice constant d of 1 μm and the operating wavelength of 2.976 μm.

With reference to FIG. 3, the device in the present invention can realize the same logic function under different lattice constants and corresponding operating wave lengths by scaling.

To sum up, the self-OR logic function of all-optical-logic-signals in the present invention can be realized through cooperation of a PhC-structure unit with a 2×2 optical-selector switch, a delayer or memory, a reference-light source and a DFF.

In the logic-signal processing in an integrated optical circuit, self-convolution operation of a single logic signal can be defined, and the above-mentioned self-OR logic operation of logic-signals is a basic operation of the self-convolution operation of logic-signals. The self-OR-transformation logic function of logic-signals realized in the present invention plays an important role in realizing self-correlation transformation or self-convolution operation of logic variables.

While the invention has been described in terms of various specific embodiments, those skilled in the art will recognize that the invention can be practiced with modification within the spirit and scope of the claims.

What is claimed is:

1. A photonic crystal (PhC) all-optical self-OR-transformation logic gate, comprising:
    an optical switch unit (OSU), a PhC-structure unit, a reference-light source, a memory or a delayer and a D-type flip-flop (DFF); an input port of the delayer is connected with a logic signal (X) of the OSU, and an output port of said delayer is connected with a X-input port of the OSU; a reference light (E) of the OSU is connected with a E-input port of said OSU; two intermediate-signal-output ports of said OSU are respectively connected with two intermediate-signal-input ports of said PhC-structure unit; a clock-signal (CP) is connected with a first CP-input port of said OSU and a second CP-input port of said DFF; and a signal-output port of said PhC-structure unit is connected with a D-signal-input port of said DFF.

2. The PhC all-optical self-OR transformation logic gate according to claim 1, wherein said OSU is a 2×2 optical-selector switch.

3. The PhC all-optical self-OR-transformation logic gate according to claim 1, wherein said PhC-structure unit is a two-dimensional (2D) PhC cross-waveguide nonlinear cavity; said PhC-structure unit is the 2D-PhC cross-waveguide four-port network formed by high-refractive-index linear-dielectric pillars, a left port of the four-port network is a first intermediate-signal-input port, a lower port is a second intermediate-signal-input port, an upper port is a signal-output port, and a right port is an idle port; two mutually-orthogonal quasi-one-dimensional (quasi-1D) PhC structures are placed along longitudinal direction in vertical waveguide and transverse direction in horizontal waveguide at a center of a cross waveguide; a nonlinear-dielectric pillar is arranged in a middle of the cross waveguide, the nonlinear-dielectric pillar is a nonlinear material, a cross section of the nonlinear-dielectric pillar is square, polygonal, circular, or oval; a dielectric constant of rectangular high-refractive-index linear-dielectric pillars clinging to the nonlinear-dielectric pillar and close to the signal-output port of the PhC-structure unit is equal to that of the nonlinear-dielectric pillar under weak light conditions; and said quasi-1D PhC structures and the nonlinear-dielectric pillar constitute a waveguide defect cavity.

4. The PhC all-optical self-OR-transformation logic gate according to claim 1, wherein said memory or the delayer includes an input port and an output port; an output signal of said delayer has T/2delay relative to an input signal thereof, where T is a clock period.

5. The PhC all-optical self-OR-transformation logic gate according to claim 1, wherein the memory or the delayer provides a delay of T/2.

6. The PhC all-optical self-OR-transformation logic gate according to claim 1, wherein said DFF includes a clock-signal-input port, a D-signal-input port and a system-output port; and an input signal of the D-signal-input port of said DFF is equal to an output signal at the signal-output port of said PhC-structure unit.

7. The PhC all-optical self-OR-transformation logic gate according to claim 3, wherein said PhC structure is a (2k+1)×(2k+1) array structure, where k is an integer more than or equal to 3.

8. The PhC all-optical self-OR-transformation logic gate according to claim 3, wherein a cross section of the high-refractive-index linear-dielectric pillar in the 2D PhC is circular, oval, triangular, or polygonal.

9. The PhC all-optical self-OR-transformation logic gate according to claim 3, wherein a background filling material for the 2D PhC is a low-refractive-index dielectric having a refractive index less than 1.4.

10. The PhC all-optical self-OR-transformation logic gate according to claim 3, wherein a background filling material for the 2D PhC is air.

11. The PhC all-optical self-OR-transformation logic gate according to claim 3, wherein a cross section of the high-refractive-index linear-dielectric pillar of the cross waveguide is rectangular, polygonal, circular, or oval.

12. The PhC all-optical self-OR-transformation logic gate according to claim 3, wherein high-refractive-index linear-dielectric pillar of the cross waveguide has a refractive index of value more than 2.

13. The PhC all-optical self-OR-transformation logic gate according to claim 3, wherein high-refractive-index linear-dielectric pillar of the cross waveguide has a refractive index of 3.4.

* * * * *